United States Patent [19]

Ohta et al.

[11] Patent Number: 4,825,056
[45] Date of Patent: Apr. 25, 1989

[54] THIN-FILM ELECTROMAGNETIC TRANSDUCER

[75] Inventors: Toshihiko Ohta, Yokohama; Fumio Izawa, Sagamihara, both of Japan

[73] Assignee: Kabushiki Kaisha Toshiba, Kawasaki, Japan

[21] Appl. No.: 932,521

[22] Filed: Nov. 20, 1986

[30] Foreign Application Priority Data

Nov. 21, 1985 [JP] Japan ................................. 60-259713
Feb. 19, 1986 [JP] Japan ................................. 61-32698

[51] Int. Cl.$^4$ ............................................. G06K 19/06
[52] U.S. Cl. .................................... 235/449; 235/493; 336/20
[58] Field of Search ....................... 235/449, 487, 493; 336/20

[56] References Cited

U.S. PATENT DOCUMENTS

| 4,550,248 | 10/1985 | Hoppe et al. | 283/83 |
|---|---|---|---|
| 4,552,383 | 11/1985 | Hoppe et al. | 283/83 |
| 4,587,413 | 5/1986 | Hoppe et al. | 283/83 |
| 4,692,604 | 9/1987 | Billings | 235/449 |

FOREIGN PATENT DOCUMENTS 60-176188 9/1985 Japan .

Primary Examiner—A. D. Pellinen
Assistant Examiner—Jeffrey A. Gaffin
Attorney, Agent, or Firm—Cushman, Darby & Cushman

[57] ABSTRACT

A thin-film type electromagnetic transducer formed on a nonmagnetic substrate by a thin-film forming process. The transducer includes a magnetic core formed on the substrate by the thin-film forming process, and a conductor coil formed on the substrate by the thin-film forming process, so as to be wound around the core. The core is shaped so that a leakage flux generated along the plane of the substrate is greater than that generated in a direction intersecting with the plane of the substrate, the leakage fluxes being generated from the core when a current is supplied to the coil. In a method for transferring signals from the thin-film type electromagnetic transducer described above, a magnetic head is located so as to face that region of the core of the transducer where the maximum leakage flux is generated. The magnetic head has a magnetic gap such that the direction of a leakage flux generated in the gap is coincident with that of the maximum leakage flux from the core, and whereby magnetic signals are transferred between the magnetic head and the maximum-leakage-flux generating region of the core.

20 Claims, 9 Drawing Sheets

THIN-FILM ELECTROMAGNETIC TRANSDUCER

BACKGROUND OF THE INVENTION

The present invention relates to a thin-film type electromagnetic transducer formed on a nonmagnetic substrate by a thin-film forming process, and a method of transferring signals from the electromagnetic transducer.

Various information-recording devices have recently been studied and developed, for the purpose of improvement. These devices include the so-called IC cards which are small in size and handy, but which possess a large memory capacity. Some of these IC cards are already commercially available. In general, an IC card is the same size as a conventional so-called credit card, which carries a magnetic stripe on its top surface. The IC card contains a semiconductor memory, as an information storage means, in place of the magnetic stripe. A plurality of terminals are arranged on the top surface of the IC card. These terminals are electrically connected to the semiconductor memory, whereby information can be read from or stored in the memory.

In order to read information from or store it in the semiconductor memory of the IC card, the card is inserted in an information-reading/writing apparatus designed for its exclusive use. In this apparatus, the terminals of the IC card are brought into contact with terminals of the apparatus, so that the memory of the card is electrically connected to the apparatus.

However, this type of IC card, with terminals thereon, has the following drawbacks:

If the terminals of the IC card come into contact with any substance, such as clothes or a curtain made of synthetic fibers, which is stored with a lot of static electricity, the semiconductor memory of the card is liable to be damaged by the static electricity. Moreover, the IC card terminals, which come into mechanical contact with the terminals in the information-reading/writing apparatus, may eventually become worn away, thus causing contact errors. If the top face of each terminal is made somewhat lower in level than the top surface of the IC card, during the manufacture of the card, contact errors can then be caused by dust which may collect in the depressions defined by the top faces of the terminals. Because they have terminals for the semiconductor memory, furthermore, the prior art IC cards cannot be used with the information-reading apparatuses which are adapted for use with conventional credit cards having a magnetic stripe thereon. Thus, use of the conventional IC cards requires development and manufacture of new or modified information-reading/writing apparatuses for their exclusive use. Accordingly, users must purchase information-reading/writing apparatus solely for IC cards which are different than the information-reading/writing apparatus used for the conventional so-called credit cards.

Japanese Patent Disclosure No. 60-176188 discloses an IC card which has been developed in order to eliminate the aforesaid drawbacks of the prior art IC cards. This IC card uses electromagnetic transducers in place of the terminals. The transducer includes a substantially U-shaped core, which extends in the thickness direction of the card. Magnetic flux generated from either end of the core, therefore, is subject to variations in magnetic intensity, in the thickness direction of the card, that is in the direction intersecting with the surface of the card. Meanwhile, the conventional information-reading apparatuses for credit cards are designed so as to read changes in the magnetic flux along the surface of the credit cards. Accordingly, even if the disclosed IC card can be loaded into these conventional apparatuses, changes in the intensity of the magnetic flux, generated from the electromagnetic transducer of the IC card, cannot easily be read by the conventional reading apparatuses. If the changes are magnified, however, they can easily be read by the conventional apparatuses. To attain this, a relatively high current must be supplied to an electric circuit in the IC card. Those batteries which can be contained in the IC card cannot be supplied with such a high current, as they are liable to be used up too soon, due to their relatively small electric capacity. Without the use of such batteries, however, the IC card must be provided, on its surface, with terminals for the supply of high current from an external power source, in which case, they are liable to be subject to the aforementioned problems.

SUMMARY OF THE INVENTION

The present invention has been conceived in consideration of these circumstances, and its first object is to provide a thin-film type electromagnetic transducer, which eliminates the aforementioned drawbacks of the prior art IC cards, having thereon terminals for a semiconductor memory, whereby information can be read from the memory, by use of a conventional information-reading apparatus designed for the so-called credit cards with a magnetic stripe, and which removes the necessity of substantial current supply to an electric circuit therein, thereby improving the life performance of an IC card using a transducer.

A second object of the invention is to provide a method of transferring signals from the thin-film type electromagnetic transducer, best adapted for the achievement of the first object of the invention.

The first object of the invention is achieved by a thin-film type electromagnetic transducer formed on a nonmagnetic substrate by a thin-film forming process, which comprises a magnetic core formed on the nonmagnetic substrate by the thin-film forming process, and a conductor coil formed on the nonmagnetic substrate by the thin-film forming process, so as to be wound around the core, the core being shaped so that a leakage flux generated along the plane of the nonmagnetic substrate is greater than that generated in a direction intersecting with the plane of the substrate, the leakage fluxes being generated from the core when current is supplied to the coil.

The second object of the invention is achieved by a method for transferring signals from a thin-film type electromagnetic transducer, the transducer comprising a magnetic core formed on a nonmagnetic substrate by a thin-film forming process, and a conductor coil formed on the nonmagnetic substrate by the thin-film forming process, so as to be wound around the core, the core being shaped so that a leakage flux generated along the plane of the nonmagnetic substrate is greater than that generated in a direction intersecting with the plane of the substrate, the leakage fluxes being generated from the core when current is supplied to the coil, wherein a magnetic head is disposed so as to face that region of the core of the transducer where the maximum leakage flux is generated, the magnetic head having a magnetic gap, such that the direction of a leakage flux generated in the gap is coincident with that of the maximum leakage flux from the core, and whereby magnetic signals are transferred between the magnetic head and the maximum-leakage-flux generating region of the core.

DETAILED DESCRIPTION OF THE PREFERRED EMBODIMENTS

Various embodiments and modifications of the present invention will now be described in detail, with reference to the accompanying drawings.

It is to be understood that the members or portions illustrated, in these drawings, may be deformed or exaggerated in size, in order to achieve a better understanding thereof.

Figure 1:
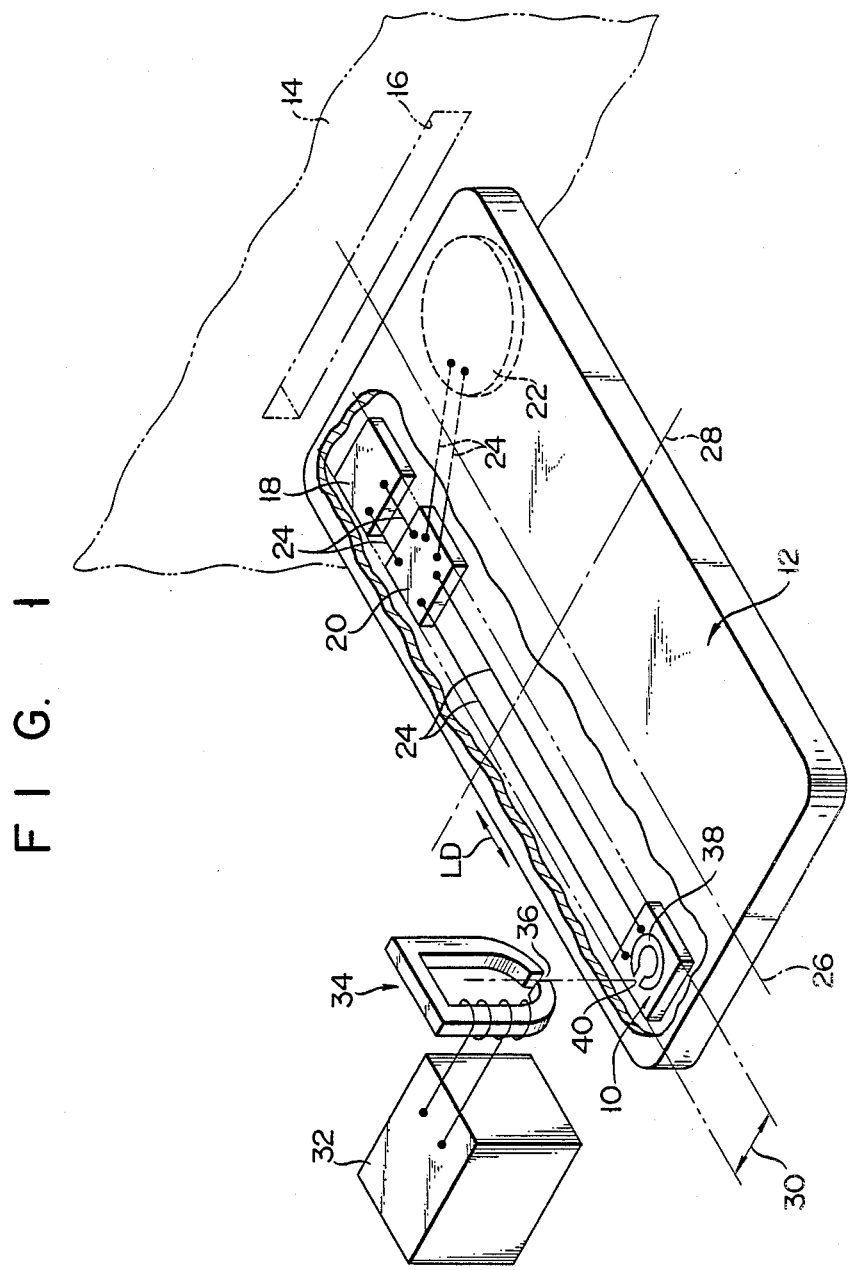
FIG. 1 is a perspective view schematically showing a state wherein an IC card, using a thin-film type electromagnetic transducer according to a first embodiment of the present invention, is located in a fixed position, in an apparatus including a magnetic reproducing unit with a magnetic head, in which part of the IC card is cut away to expose the inside thereof.

FIG. 1 shows IC card 12 which comprises thin-film type electromagnetic transducer 10 according to a first embodiment of the present invention. Having the same shape and size as the conventional so-called credit cards, card 12 is formed of a plurality of layers stacked for lamination. As is shown in FIG. 1, card 12 is inserted in an apparatus, such as a bank cash dispenser, which is adapted for use with the credit cards. Card slot 16 for insertion of card 12 is formed in housing 14 of the apparatus. IC card 12 further comprises memory IC 18, driving IC 20, and thin type battery 22. Transducer 10, ICs 18 and 20, and battery 22 are buried in the stacked layers of card 12, without being exposed to the outside, and are electrically connected to one another, by means of wires 24 printed on one of the layers. Further, elements 10, 18, 20, and 22 are located so as to avoid longitudinal and transverse center lines 26 and 28 of card 12. If card 12 is bent, maximum stress is produced on center lines 26 and/or 28. Thus, elements 10, 18, 20, and 22, arranged in the aforesaid manner, cannot be damaged through bending of the card. Moreover, transducer 10 is located within region 30 of card 12, which corresponds to the region of the credit card where a magnetic stripe is located. When card 10 has been inserted through card slot 16 into the cash dispenser, and is held in a fixed position in the dispenser, as is shown in FIG. 1, magnetic head 34 of information-reproducing unit 32 is located above transducer 10, corresponding to that region of transducer 10 where the maximum leakage flux is generated. Magnetic gap 36 of head 34 extends at right angles to the longitudinal direction of region 30 of card 12, that is, the direction of card insertion or longitudinal direction LD of card 12. The direction of the leakage flux produced in gap 36 is in alignment with direction LD. In this embodiment, core 38 of transducer 10 has a ring-shaped plane configuration, and the extending direction of magnetic gap 40, where the maximum leakage flux is generated, is coincident with that of gap 36 of magnetic head 34. The direction of leakage flux in gap 40 is in alignment with that of the leakage flux in gap 36 or direction LD.

Figure 2:
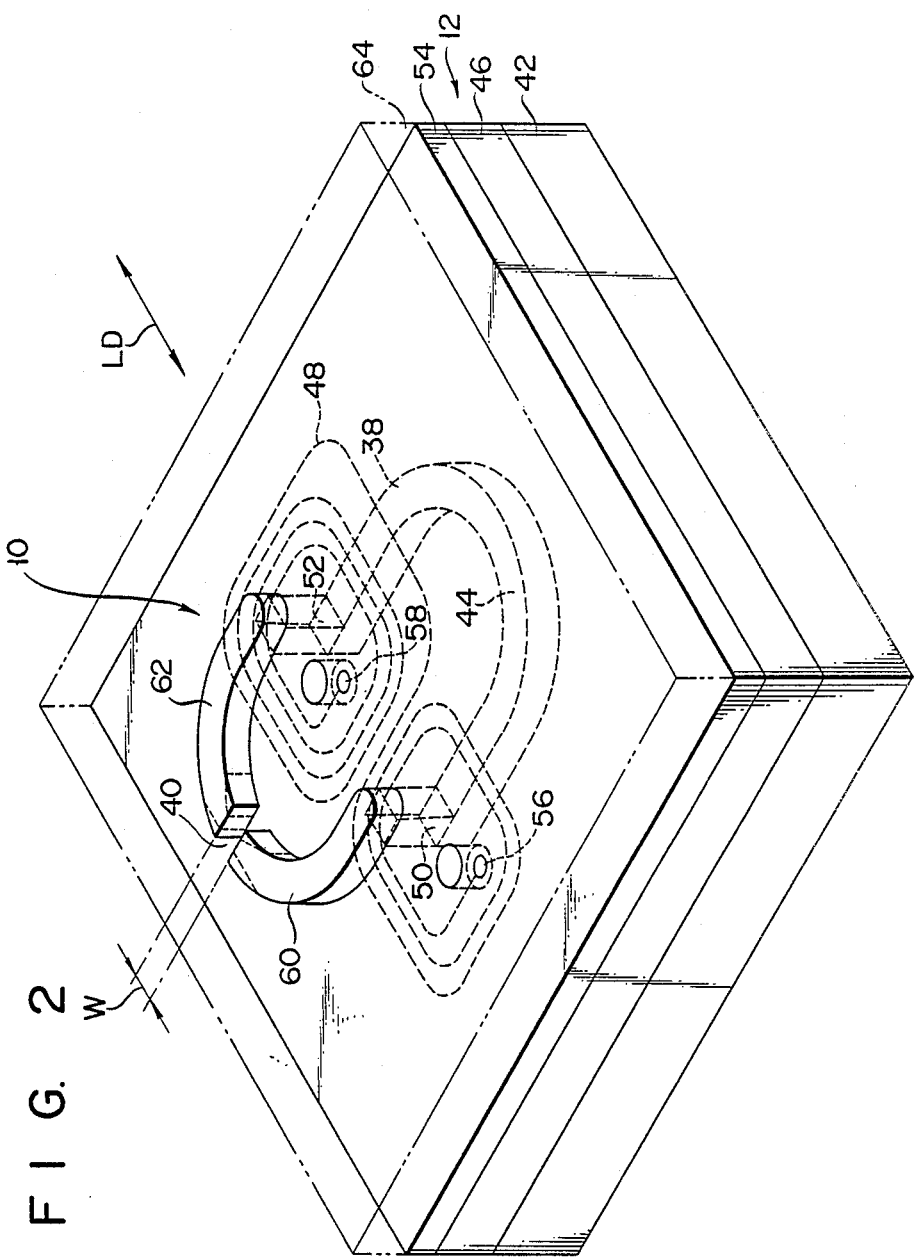
FIG. 2 is an enlarged perspective view schematically showing the transducer of FIG. 1.

FIG. 2 shows thin-film type electromagnetic transducer 10 of FIG. 1 in detail.

Figure 3:
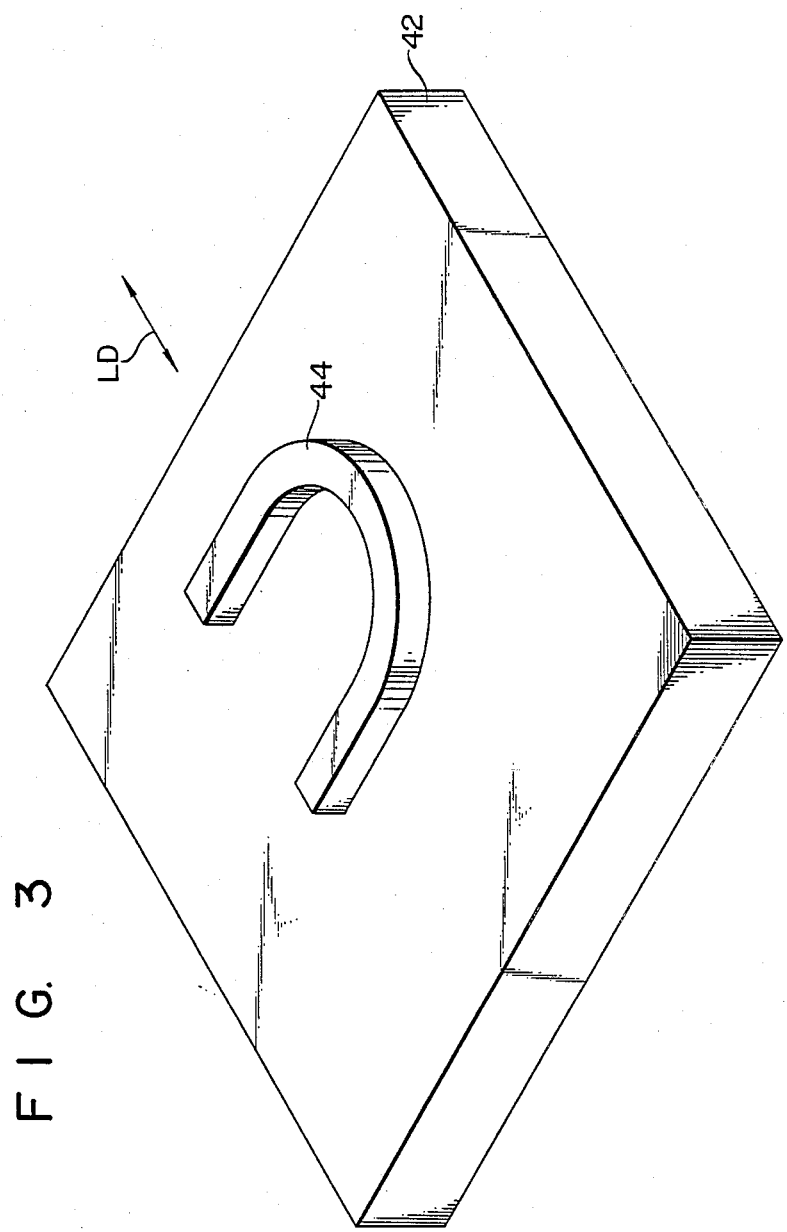
FIGS. 3 to 5 are schematic perspective views successively showing processes for manufacturing the transducer of FIG. 2.

As is shown in FIG. 3, U-shaped first core member 44 is formed on the upper surface of nonmagnetic substrate 42 of IC card 12, by a thin-film forming process such as vapor deposition, sputtering, or plating. In this embodiment, substrate 42 is about 0.3 mm thick, and member 44 is about 10 μm thick. Member 44, which is formed of a magnetic material such as FeNi, FeAlSi, amorphous CoZr, etc., has outside and inside diameters of about 2 mm and 1 mm, respectively.

Figure 4:
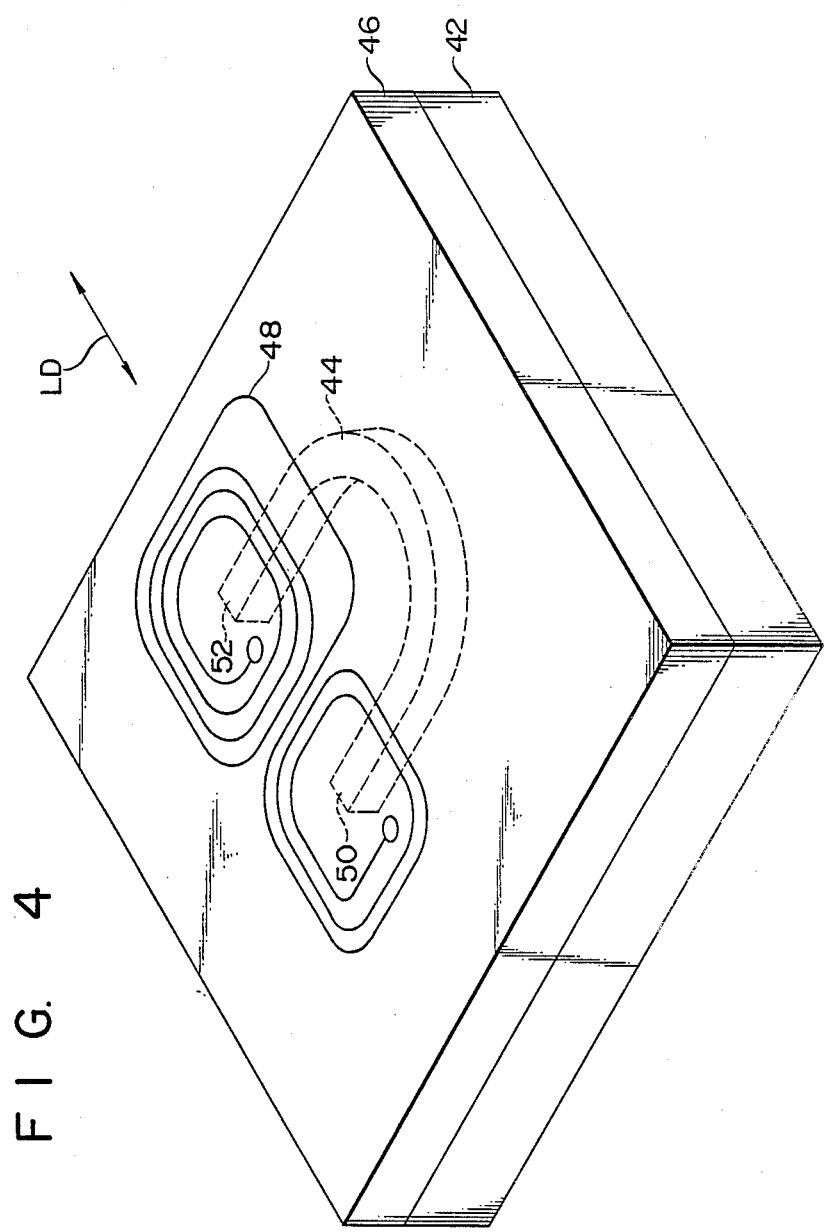
Figure 5:
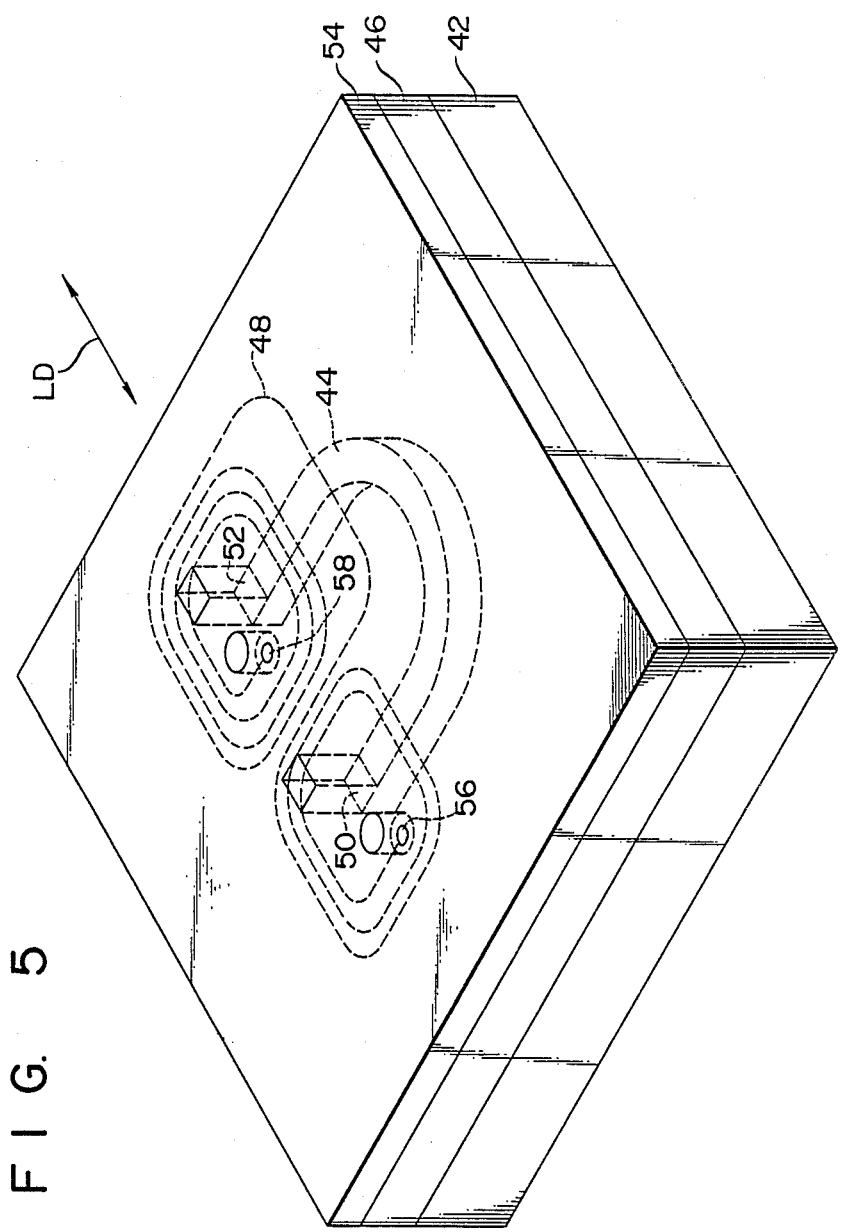

As can be seen from FIG. 4, first SiO$_2$ film 46, with a thickness of about 20 μm, is formed on nonmagnetic substrate 42, so as to cover first core member 44. The upper surface of film 46, like that of substrate 42, is flat. Coil 48, made of a single conductor wire, is formed on the upper surface of film 46, by etching, after a conductor film, such as Cu, Al, etc., having a thickness of about 1 μm, is formed on first SiO$_2$ film 46. Coil 48 includes two spiral coil portions, whose center spaces are located individually above two opposite end portions 50 and 52 of core member 44. As is shown in FIG. 5, a second SiO$_2$ film of approximately 3 μm thickness is also formed on the upper surface of film 46, for insulation of coil 48. Those portions of film 54 corresponding to end portions 50 and 52 of member 44 and both ends 56 and 58 of coil 48 are removed by etching, in order to expose portions 50 and 52 and ends 56 and 58. As is shown in FIG. 2, a pair of second core members 60 and 62 are formed on the upper surface of film 54, using the same material and the same method as for first core member 44, so that their respective one end portions are located individually over end portions 50 and 52 of member 44. Members 60 and 62 have substantially the same thickness as member 44. The other ends of members 60 and 62 face each other, with a narrow space between them, thereby defining magnetic gap 40. Thus, members 60 and 62, in conjunction with member 44, constitute a ring-shaped structure. Film 54 is formed with two apertures through which end portions 50 and 52 of first core member 44 are exposed to the outside. These apertures are filled up by the material of second core members 60 and 62, during the formation thereof. As a result, member 44 is connected magnetically to members 60 and 62.

Thin-film type electromagnetic transducer 10 of the first embodiment, constructed in this manner, is formed on nonmagnetic substrate 42, according to the processes shown successively in FIGS. 3, 4, 5, and 2. Then, both ends 56 and 58 of coil 48 are electrically connected to driving IC 20, which has been previously formed on substrate 42. By this time, memory IC 18 and battery 22 also have been mounted on substrate 42, and the electrical connection between ICs 18 and 20 and battery 22 is accomplished. Finally, transducer 10, ICs 18 and 20, and battery 22 are covered with layer 64, which serves to protect them from external force. Transducer 10 can flex as IC card 12 is bent. Therefore, as long as card 12 is bent only within a predetermined range of curvature, transducer 10 cannot be damaged.

In this embodiment, width W of the magnetic gap of electromagnetic transducer 10 is set to about 0.1 mm. The reason for this is that the positional accuracy of transducer 10 of flexible IC card 12, relative to magnetic head 34 of information-reproducing unit 32, is about 0.1 mm when card 12 is located in the fixed position in the cash dispenser, as shown in FIG. 1. Width W of this embodiment, adjusted to about 0.1 mm, is much greater than the width of the magnetic gap of conventional magnetic heads. In general, the inside diameter of the core is expected to be not less than about ten times as long as the length of the magnetic head. In this embodiment, the inside diameter is set to approximately 1 mm.

The respective other end portions of second core members 60 and 62, facing each other, may be tapered, as is indicated by dotted lines in FIG. 2, in order to strengthen the leakage flux from magnetic gap 40.

Figure 6:
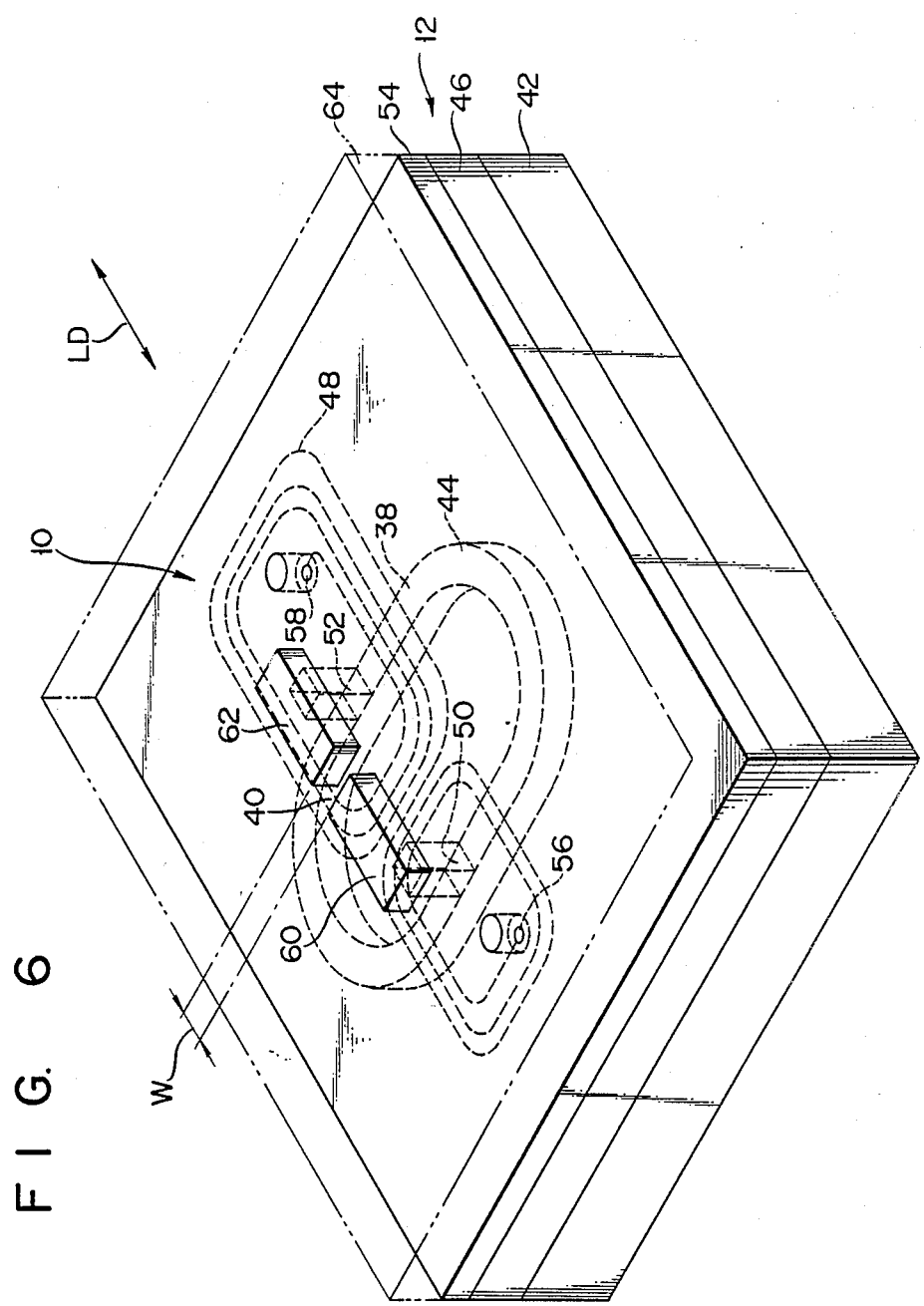
FIG. 6 is an enlarged perspective view schematically showing a modification of the transducer of FIG. 2.

FIG. 6 shows a modification of the aforementioned first embodiment of he present invention. In the description to follow, like reference numerals are used to designate like portions, as included in the first embodiment, for simplicity of illustration.

In this modification, first core member 44 is ring-shaped, while a pair of second core members 60 and 62 are straight in shape. Members 60 and 62 are arranged in the diametrical direction of member 44. The respective first ends of members 60 and 62 are located individually above diametrically opposite regions of the upper surface of member 44, which are exposed to the upper surface of second $SiO_2$ film 54, through apertures therein. Second core members 60 and 62 are connected magnetically to first core member 44 when the apertures of film 54 are filled up by the material of members 60 and 62, while members 60 and 62 are being formed. The respective second ends of members 60 and 62 face each other, so as to define magnetic gap 40 with width W between them. Also in this modification, the second end portions of members 60 and 62 may be tapered.

Figure 7:
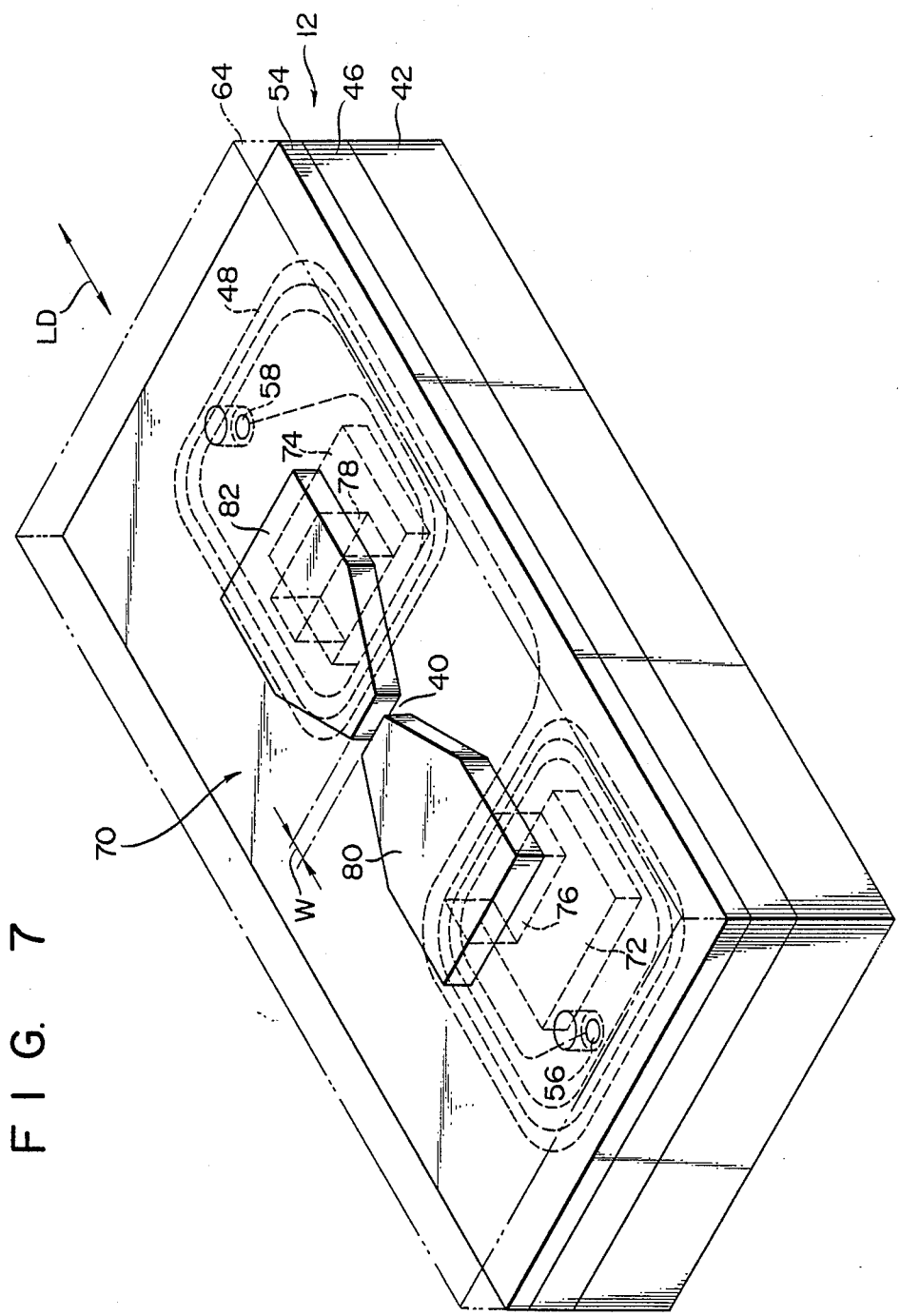
FIG. 7 is an enlarged perspective view schematically showing a thin-film type electromagnetic transducer according to a second embodiment of the invention.

FIG. 7 shows thin-film type electromagnetic transducer 70 according to a second embodiment of the present invention. In the description of this embodiment, like reference numerals are used to designate like portions, as included in the first embodiment, for simplicity of illustration.

In this embodiment, a pair of first core members are formed on the upper surface of nonmagnetic substrate 42, by the thin-film forming process. Members 72 and 74, which are spaced in longitudinal direction LD of IC card 12, are located in the respective centers of two spiral portions of coil 48, formed on the upper surface of first $SiO_2$ film 46. Both ends 56 and 58 of coil 48 and those regions 76 and 78 of members 72 and 74 in the centers of the spiral coil portions, are exposed to the upper surface of film 54, through apertures which are formed in film 54, by way of etching. A pair of second core members 80 and 82 are formed on the upper surface of film 54, by the thin-film forming process. First end portions of members 80 and 82 are located above regions 76 and 78 of members 72 and 74, respectively. Members 80 and 82 are connected magnetically to first core members 72 and 74, respectively, when the etched apertures of film 54 for regions 76 and 78 are filled up by the material of members 80 and 82, while members 80 and 82 are being formed. Members 80 and 82 are straight in shape, and extend so as to approach each other along direction LD of card 12. Second end portions of members 80 and 82 face each other, so as to define magnetic gap 40 having width W. The second end portions are tapered so that the intensity of leakage flux generated in magnetic gap 40, when coil 48 is energized, is higher than that of leakage flux from any region other than gap 40. The various components of transducer 70 of the second embodiment, constructed in this manner, have the same thicknesses as their counterparts which constitute transducer 10 of the first embodiment.

In thin-film type electromagnetic transducer 70 according to the second embodiment, having the construction described above, the maximum leakage flux is generated in magnetic gap 40 when current is supplied to coil 48. The direction of the maximum leakage flux is parallel to the surface of IC card 12, and is in line with longitudinal direction LD thereof.

Figure 8:
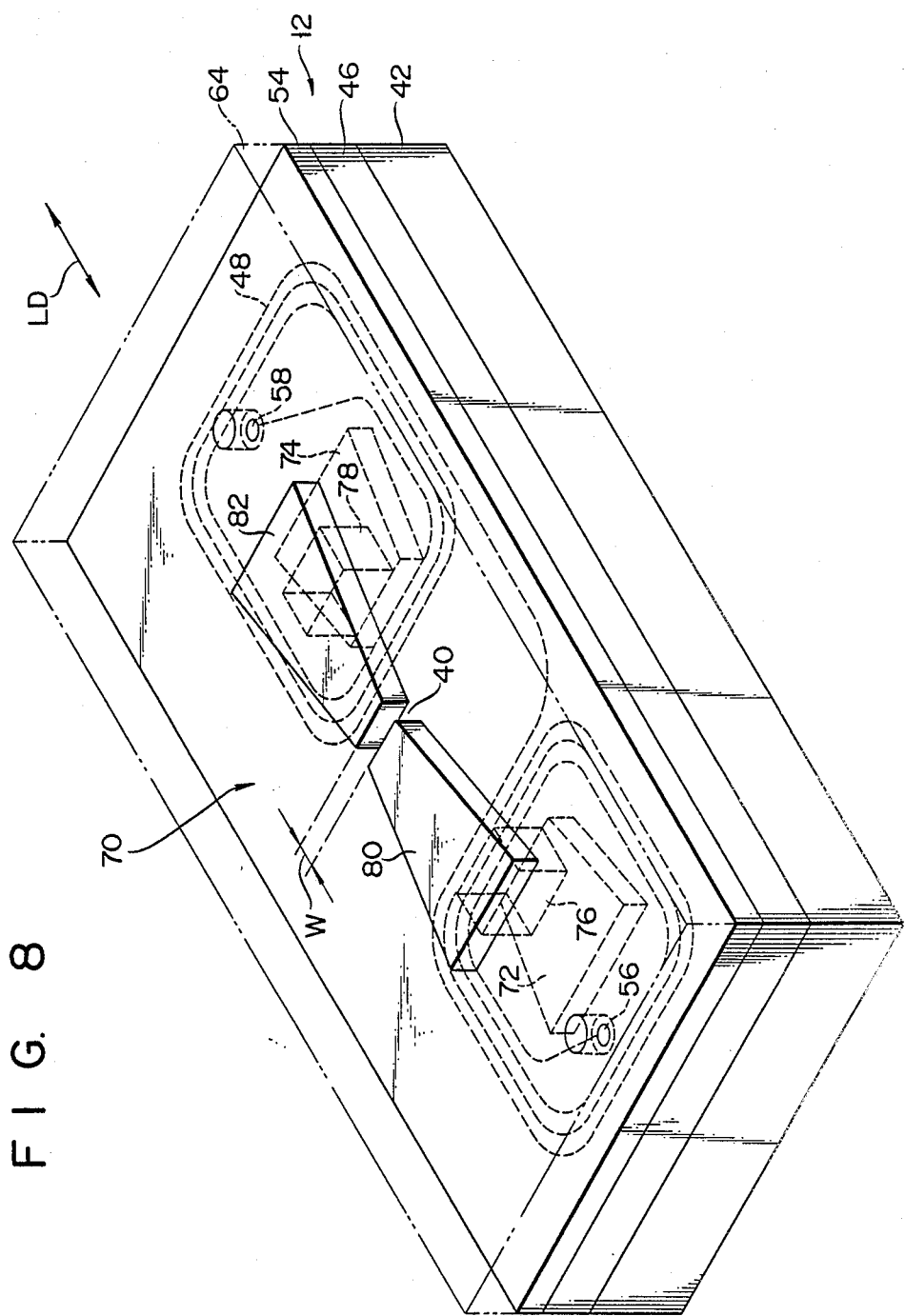
FIG. 8 is an enlarged perspective view schematically showing a first modification of the transducer of FIG. 7.

FIG. 8 shows a first modification of transducer 70 according to the second embodiment. In the description to follow, like reference numerals are used to designate like portions, as included in the second embodiment, for simplicity of illustration.

In this first modification, a pair of first core members 72 and 74 each have the shape of an isosceles trapezoid, and are arranged symmetrically with respect to magnetic gap 40. In addition, a pair of second core members 80 and 82 each also having the shape of an isosceles trapezoid, are arranged symmetrically with respect to gap 40. The shorter of the two parallel sides of each trapezoid is located on the side near to gap 40. The tilt angle of the two nonparallel sides of first core members 72 and 74, to the parallel sides thereof, is equal to that of the two nonparallel sides of second core members 80 and 82. As viewed from directly above IC card 12, therefore, the nonparallel sides of members 72 and 74 look as if they are continuous with those of their corresponding members 80 and 82.

Figure 9:
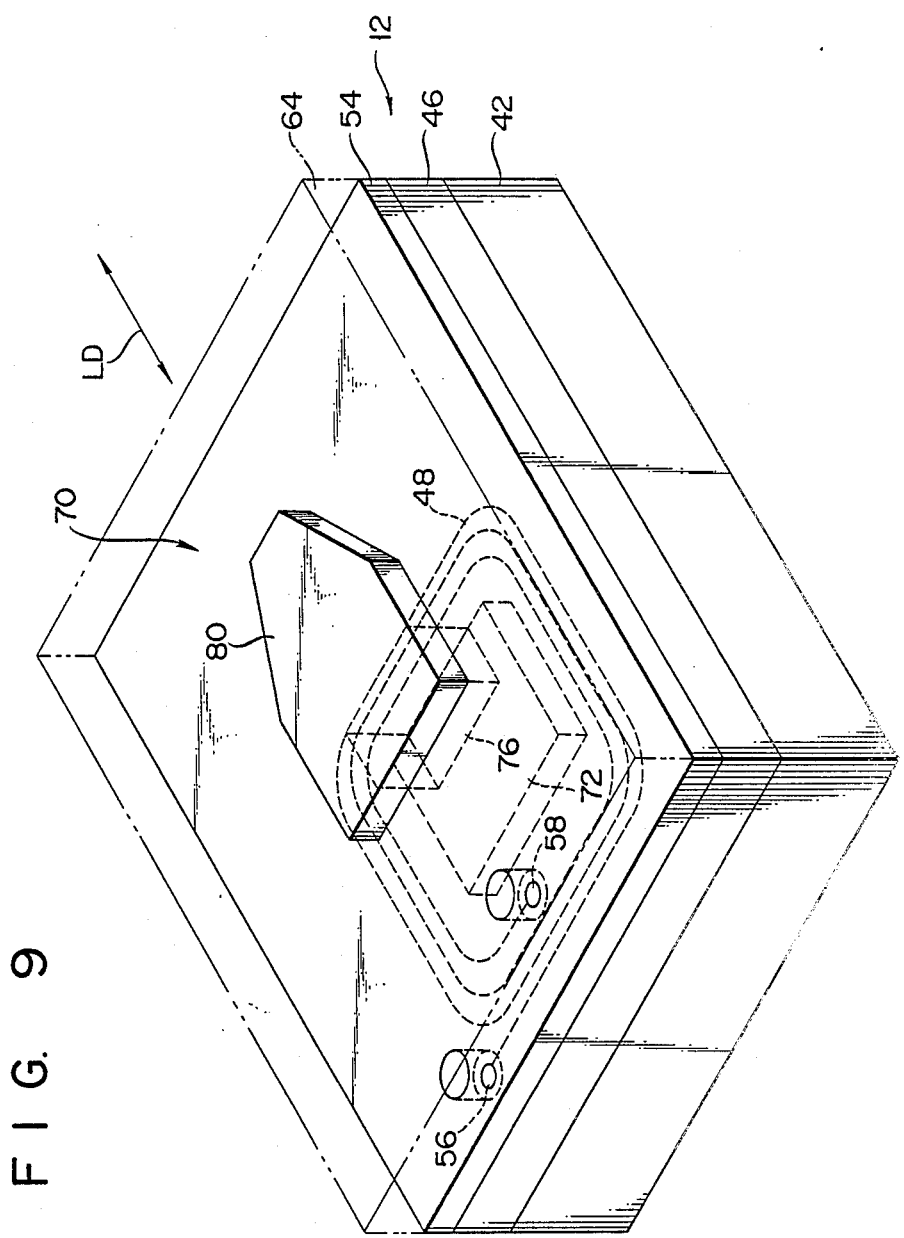
FIG. 9 is an enlarged perspective view schematically showing a second modification of the transducer of FIG. 7.

FIG. 9 shows a second modification of transducer 70 according to the second embodiment. In the description to follow, like reference numerals are used to designate like portions, as included in the second embodiment, for simplicity of illustration.

In this second modification, the core is formed only of one first core member 72 and one second core member 80. Also, coil 48 includes only one spiral portion, centering around the single first core member. The second end portion of member 80 is tapered in longitudinal direction LD of IC card 12, so as to cause the maximum leakage flux to be generated parallel to the upper surface of card 12, in direction LD, when coil 48 is energized. According to transducer 70 of the second modification, constructed in this manner, the end face of the tapered end portion of member 80 must be located directly under magnetic gap 36 of magnetic head 34 of magnetic-reproducing unit 32, when IC card 12 is located in the fixed position, in the cash dispenser for conventional credit cards, as shown in FIG. 1.

It is to be understood that the present invention is not limited to the embodiments and modifications described above, and that various changes and other modifications may be effected therein, by one skilled in the art, without departing from the scope or spirit of the invention.

Although only one thin-film type electromagnetic transducer 10 is shown in FIG. 1, two or more transducers may be arranged in IC card 12. Moreover, the electric circuit of card 12 may be supplied with electric power from a power source which is provided in the cash dispenser. In this case, power supply terminals are arranged on the surface of card 12 so that they become connected to the power source when the card is set in the fixed position in the dispenser. Alternatively, the power supply to the electric circuit of card 12 may be effected by using noncontact-type electrical power-transfer means, which connects the electric circuit to a power source in the cash dispenser.

What is claimed is:

1. A thin-film type electromagnetic transducer formed on a nonmagnetic substrate by a thin-film forming process, comprising:
    a magnetic core formed on the nonmagnetic substrate by the thin-film forming process, said core including a pair of members defining a magnetic gap therebetween; and
    a conductor coil formed on the nonmagnetic substrate by the thin-film forming process, so as to be wound around the core;
    said core being shaped so that a leakage flux generated along the plane of the nonmagnetic substrate is greater than a leakage flux generated in a direction intersecting with the plane of the substrate and said members being arranged so that a leakage flux generated in the magnetic gap along the plane of the nonmagnetic substrate is greater than in any other region along the plane of the nonmagnetic substrate, said leakage flux generated along the plane of the nonmagnetic substrate and in a direction intersecting with the plane of the substrate being generated from the core when a current is supplied to the coil.

2. A thin-film type electromagnetic transducer according to claim 1, wherein said nonmagnetic substrate has a substantially rectangular plane shape, and said transducer is embedded in a card at a region thereof other than the longitudinal and transverse center lines thereof.

3. A thin-film type electromagnetic transducer according to claim 2, wherein the card in which said transducer is embedded is a conventional credit card having a magnetic strip thereon, and said transducer is located within a region of the credit card bearing the magnetic strip.

4. The thin-film electromagnetic transducer according to claim 1, wherein said core members have tapered end portions which face each other, so as to define the magnetic gap.

5. The thin-film type electromagnetic transducer according to claim 4, wherein said core members include outer end portions opposite to said tapered end portions said outer end portions being connected magnetically to each other, by means of a magnetic material formed on the nonmagnetic substrate by the thin-film forming process, thus constituting a ring-shaped configuration.

6. An apparatus for transmitting and receiving signals to and from a thin-film type electromagnetic transducer in a card, said transducer comprising a magnetic core formed on the nonmagnetic substrate by a thin-film forming process; and a conductor coil formed on the nonmagnetic substrate by the thin-film forming process, so as to be wound around the core, said core including a pair of members defining a magnetic gap therebetween said core being arranged so that a leakage flux generated along the plane of the nonmagnetic substrate is greater than a leakage flux generated in a direction intersecting with the plane of the substrate and the members are arranged so that a leakage flux generated in the magnetic gap along the plane of the substrate is greater than that from any other region along the plane of the nonmagnetic substrate, said leakage flux generated along the plane of the substrate and said leakage flux generated in a direction intersecting with the plane of the substrate being generated from the core when a current is supplied to the coil,
    said apparatus comprising a magnetic head disposed so as to face the magnetic gap, said magnetic head having a magnetic gap such that the direction of a leakage flux generated in the gap of the head is coincident with the magnetic gap between the members and whereby magnetic signals are transferred between the magnetic head and the magnetic gap between the members.

7. An apparatus according to claim 6, wherein said nonmagnetic substrate has a substantially rectangular plane shape, and said transducer is embedded in the card at a region thereof other than the longitudinal and transverse center lines thereof.

8. An apparatus according to claim 7, wherein the card in which said transducer is embedded is a conventional credit card having a magnetic strip thereon, and said transducer is located within a region of the credit card bearing the magnetic strip.

9. An apparatus according to claim 6, wherein said pair of members of said core members are tapered.

10. The apparatus according to claim 9, wherein said core members include outer end portions disposed opposite to said tapered portions said outer end portions being connected magnetically to each other, by means of a magnetic material formed on the nonmagnetic substrate by the thin-film forming process, thus constituting a ring-shaped configuration.

11. A thin-film type electromagnetic transducer formed on a non-magnetic substrate by a thin-film forming process, comprising:
    a first core member formed on the non-magnetic substrate by the thin-film forming process said first core member including a pair of end portions;
    a first non-electrical conductive film formed on the substrate, so as to cover the first core member;
    a pair of conductor coils formed on the upper surface of the first non-electrical conductive film by the thin-film forming process;
    a second non-electrical conductive film formed on the first non-electrical conductive film, so as to cover the paired conductor coils, the second non-electrical conductive film having a pair of holes which open on the upper surface thereof to be located separately and which extend from the upper surface thereof to said pair of end portions of the first core member through the centers of the paired conductor coils; and
    a pair of second core members formed on the upper surface of the second non-electrical conductive film by the thin film forming process, one end of each of the second core members being electrically connected to either one of the paired portions of the first core member through either one of the paired holes of the second non-electrical conductive film so as to make a magnetic gap;
    whereby leakage flux is generated between the paired second core members when a current is supplied to the paired conductive coils, leakage flux which is oriented along the outer surface of the second non-electrical conductive film in the magnetic gap being greater than leakage flux which is oriented to intersect the outer surface of the second non-electrical conductive film in the outside of the magnetic gap.

12. The thin-film type electromagnetic transducer according to claim 11, wherein said first core member includes a pair of blocks located apart from each other on the non-magnetic substrate and the paired portions of said first core member are provided on the paired blocks, respectively.

13. The thin-film type electromagnetic transducer according to claim 11, wherein said nonmagnetic substrate has a substantially rectangular plane shape, and said transducer is embedded in a card at a region thereof other than the longitudinal and transverse center lines thereof.

14. The thin-film type electromagnetic transducer according to claim 11, wherein the card in which said transducer in embedded is a conventional credit card having a magnetic strip thereon, and said transducer is located within a region of the credit card bearing the magnetic strip.

15. The thin-film type electromagnetic transducer according to claim 11, wherein the other ends of said paired second core members which define the magnetic gap, are tapered.

16. An apparatus for transmitting and receiving signals to and from a thin-film type electromagnetic transducer, said transducer including:
a first core member formed on the non-magnetic substrate by the thin-film forming process, said first core member including a pair of end portions;
a first non-electrical conductive film formed on the substrate, so as to cover the first core member;
a pair of conductor coils formed on the outer surface of the first non-electrical conductive film by the thin film forming process;
a second non-electrical conductive film formed on the first non-electrical conductive film, so as to cover the paired conductor coils, the second non-electrical conductive film having a pair of holes which open on the outer surface thereof to be located separately and which extend from the outer surface thereof to said pair of end portions of the first core member through the centers of the paired conductor coils; and
a pair of second core members formed on the outer surface of the second non-electrical conductive film by the thin film forming process, one end of each of the second core members being electrically connected to either one of the paired portions of the first core member through either one of the paired holes of the second non-electrical conductive film, so as to make a magnetic gap, whereby leakage flux is generated between the paired second core members when a current is supplied to the paired conductive coils, leakage flux which is oriented along the outer surface of the second non-electrical conductive film in the magnetic gap being greater than leakage flux which is oriented to intersect the outer surface of the second non-electrical conductive film in the outside of the magnetic gap,
a magnetic head which is to be disposed with its magnetic gap facing magnetic gap of said paired second core members so that the direction of the leakage flux generated in the magnetic gap of said magnetic head is coincident with that of the maximum leakage flux in the magnetic gap of said paired second core members, whereby magnetic signals are transferred between said magnetic head and said paired second core members of said transducer.

17. The apparatus according to claim 16, wherein said nonmagnetic substrate of said transducer has a substantially rectangular plane shape, and said transducer is embedded in a card at a region thereof other than the longitudinal and transverse center lines thereof.

18. The apparatus according to claim 16, wherein the card in which said transducer is embedded is a conventional credit card having a magnetic strip thereon, and said transducer is located within a region of the credit card bearing the magnetic strip.

19. The apparatus according to claim 16, wherein the other ends of said paired second core members which define the magnetic gap of said transducer, are tapered.

20. The apparatus according to claim 16, wherein said first core member of said transducer includes a pair of blocks located apart from each other on the non-magnetic substrate, and the paired portions of said first core member are provided on the paired blocks, respectively.

* * * * *